UNITED STATES PATENT OFFICE.

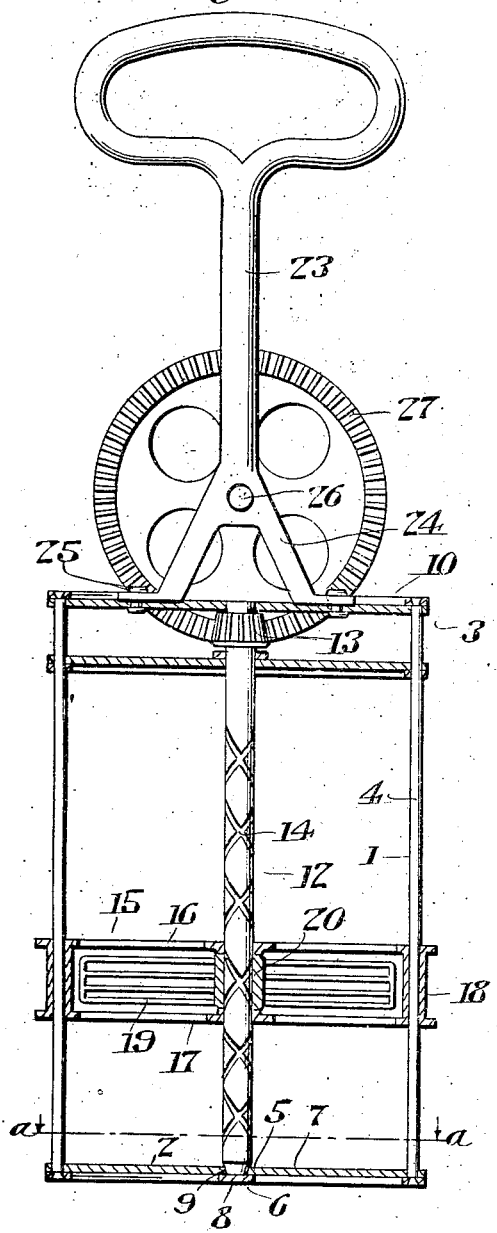

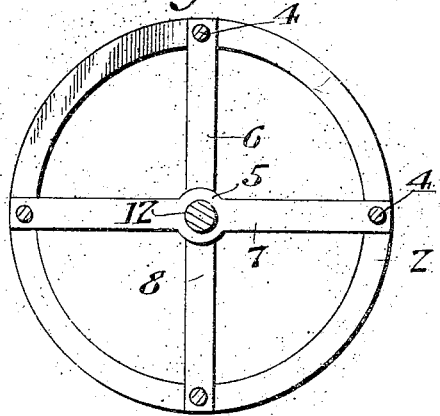
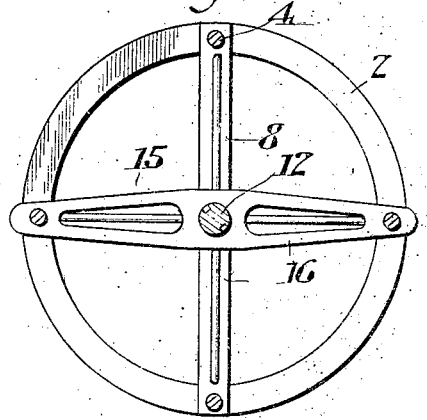
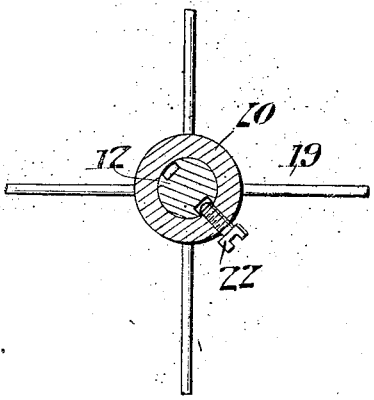

AUGUSTUS H. SEARS, OF GREENSBORO, NORTH CAROLINA.

EGG-BEATER.

1,186,526.

Specification of Letters Patent.

Patented June 6, 1916.

Application filed August 24, 1915. Serial No. 47,125.

*To all whom it may concern:*

Be it known that I, AUGUSTUS H. SEARS, a citizen of the United States, residing at Greensboro, in the county of Guilford and State of North Carolina, have invented new and useful Improvements in Egg-Beaters, of which the following is a specification.

This invention relates to improvements in egg beaters, the object of the invention being to provide an improved device of this character which is especially adapted for use in beating eggs and in mixing liquids and other like purposes, and which is simple in construction, is strong and durable and in which the beating element is revoluble in reverse directions and is also moved upwardly and downwardly when in operation to thoroughly agitate and beat the eggs or other material.

The invention consists in the construction, combination and arrangement of devices hereinafter described and claimed.

In the accompanying drawings:—Figure 1 is a vertical sectional view of an egg beater constructed in accordance with my invention. Fig. 2 is a vertical sectional view of the same on the plane at right angles to that of Fig. 1. Fig. 3 is a horizontal sectional view of the same on the plane indicated by the line *a—a* of Fig. 1. Figs. 4—5 are detail views.

In the embodiment of my invention I provide a frame 1 which is here shown as comprising a circular bottom 2, a circular top 3 and vertical rods 4 which connect the top and bottom. The bottom comprises a pair of members 5—6, the cross bars 7—8 of which are at right angles to each other, the upper cross bar 7 having a central bearing opening 9 which is closed on the lower side by the cross bar 8. The top 3 of the frame comprises an upper member 10 and a lower member 11 spaced a suitable distance therefrom, each of said members having a central bearing opening.

A vertically arranged shaft 12 has its lower end stepped in the bearing 9 and its upper portion mounted in the bearings in the center of the members 10—11 of the top and is provided at a point between said members with a pinion 13. The shaft has reversely arranged screw threads 14, which extend from near the upper end to near the lower end of said shaft.

A shifting bar 15 comprises upper and lower members 16—17 which are connected together at their ends by tubular guides 18 which operate on two of the rods 4 of the frame so that said shifting bearing is mounted for vertical reciprocating movement.

A beater element 19 is provided, which comprises a hub 20 and radially arranged wings 21. The hub is slidable vertically on the shaft and has a set screw 22 to engage the threads of the shaft so that the shaft when turned first in one direction and then in the reverse direction causes the beater element to rotate therewith but at a lower rate of speed, owing to the retarding resistance of the materials and the screw or point 22 coacts with the reversely arranged screw threads of the shaft to move the shifting bar and also the beater element up and down in the frame and thereby cause the beater element to the more thoroughly beat, agitate and stir the eggs or other material.

A vertically arranged handle 23 has its lower end provided with oppositely inclined standards 24 which are secured as at 25 on the cross bar of the upper member 10 of the frame. A stub shaft 26 projects from one side of the handle 23 and forms the bearing for a gear wheel 27 which engages the pinion 13 and is provided with a crank handle 28 whereby said gear wheel may be turned in reverse directions, and caused to coöperate with the pinion and thereby impart the required reverse rotary movements to the shaft.

Having thus described my invention, I claim:—

1. In a device of the class described the combination of a frame, a shaft mounted therein for rotation and provided with oppositely arranged screw threads, a shifting element mounted in the frame and having reciprocating movement and a revoluble beater element arranged in said shifting element, mounted on the shaft for rotation therewith and having an element to engage the threads of the shaft alternately and hence cause the shaft, when turned alternately in reverse directions, to correspondingly rotate said beater element and also move said beater element vertically.

2. In a device of the class described the combination of a frame, a shaft mounted therein for rotation and provided with oppositely arranged screw threads, a shifting element mounted in the frame and having reciprocating movement, and a revoluble beater element arranged in said shifting element, mounted on the shaft for rotation therewith and having an element to engage the threads of the shaft alternately and hence cause the shaft, when turned alternately in reverse directions, to correspondingly rotate said beater element and also move said beater element vertically, a pinion on the shaft, a handle at the upper end of the frame, a gear wheel mounted on one side of said handle and engaging said pinion and means to enable said gear wheel to be turned.

In testimony whereof I affix my signature in presence of two witnesses.

AUGUSTUS H. SEARS.

Witnesses:
  Mrs. J. E. McKnight,
  Joe S. Phipps.